United States Patent [19]
Nagatsuka et al.

[11] Patent Number: 4,965,160

[45] Date of Patent: Oct. 23, 1990

[54] ELECTROPHOTOGRAPHIC DEVELOPER CARRIER PARTICLES COATED WITH BINDER RESIN

[75] Inventors: Ikutaroh Nagatsuka; Yasuo Matsumura; Masayuki Takeda; Chiaki Suzuki; Takayoshi Aoki, all of Kanagawa, Japan

[73] Assignee: Fuji Xerox Co., Ltd., Tokyo, Japan

[21] Appl. No.: 412,567

[22] Filed: Sep. 25, 1989

Related U.S. Application Data

[63] Continuation of Ser. No. 91,146, Aug. 31, 1987, abandoned, which is a continuation-in-part of Ser. No. 58,421, Jun. 5, 1987, Pat. No. 4,791,041.

[30] Foreign Application Priority Data

Aug. 29, 1986 [JP] Japan ..... 61-201577
Aug. 29, 1986 [JP] Japan ..... 61-201579

[51] Int. Cl.$^5$ ..... B32B 9/00; G03G 9/10
[52] U.S. Cl. ..... 430/108; 428/407
[58] Field of Search ..... 430/108; 428/407

[56] References Cited

U.S. PATENT DOCUMENTS

| | | | |
|---|---|---|---|
| 3,767,578 | 10/1973 | Hagenbach et al. | 430/108 X |
| 3,795,618 | 5/1974 | Kasper et al. | 430/108 |
| 3,873,355 | 3/1975 | Queener et al. | 430/108 |
| 3,918,968 | 11/1975 | Kukla et al. | 430/108 X |

*Primary Examiner*—J. David Welsh
*Attorney, Agent, or Firm*—Sughrue, Mion, Zinn, Macpeak & Seas

[57] ABSTRACT

A developer carrier is disclosed, which has a core containing a binder resin and a magnetic powder, and a surface layer thereon containing a compound having a lower critical surface tension than the binder resin. This developer when used in a magnetic brush development process provides superior charge characteristics, resistance to environmental changes, and extended life. In another aspect, the invention relates to a developer carrier produced by a process of (a) melting a carrier composition containing a binder resin, a magnetic powder and a compound having a lower critical surface tension than the binder resin, (b) spraying the molten carrier composition to form droplets, and (c) cooling the droplets with a gas stream having a temperature lower than the melting point of the composition to form substantially spherical particles having a high surface smoothness.

17 Claims, No Drawings

ELECTROPHOTOGRAPHIC DEVELOPER CARRIER PARTICLES COATED WITH BINDER RESIN

This is a continuation, of application Ser. No. 091,146, filed Aug. 31, 1987, now abandoned, which is a Continuation-In-Part application of a prior application Ser. No. 058,421, filed June 5, 1987, now U.S. Pat. No. 4,791,041 entitled "CARRIER FOR DEVELOPER", now abandoned.

FIELD OF THE INVENTION

The present invention relates to a carrier which is one of the two components of a developer used in development of a latent electrostatic or magnetic image in electrophotography, electrostatic recording or electrostatic printing. More particularly, the present invention relates to a carrier of the type which has a magnetic material dispersed therein.

BACKGROUND OF THE INVENTION

Electrophotographic processing is commonly performed by a procedure in which a latent electrostatic image is formed by various electrical techniques on a photoreceptor made of selenium or some other suitable photoconductive material, and toner particles are deposited on the latent image by a suitable method of development, such as a magnetic brush method, to produce a visible image.

In the development step, carrier particles are used in order to impart an appropriate amount of positive or negative electrical charge to the toner. Various types of carriers have been developed and used commercially.

While carriers are required to possess various characteristics, particularly important requirements include appropriateness of the polarity of charges generated by electrification, high impact and wear resistance, efficiency in development, and long developer life. In these respects, conventional carriers are still inadequate, and a product having satisfactory characteristics has not yet been achieved. For example, iron oxide powders and other electrically conductive carriers are capable of producing solid developed images of high quality but are not equally effective in reproducing fine lines of good quality. Furthermore, they require a special charge control agent to be incorporated in the toner in order to extend the life of the developer. Developers using coated carriers (i.e., with an insulating coating) have an extended life and the capability of reproducing fine lines of good quality, but they are ineffective in reproduction of solid developed images of high quality. With a view to solving these problems, microtoning carriers, i.e., carriers consisting of small-diameter particles in which fine magnetic particles are dispersed in a binder resin have been proposed and commercialized. However, they have not completely solved the problem of short developer life, because small-diameter carrier particles have a great tendency to adhere to the surface of the photoreceptor; their chargeability varies under hot and dry conditions on account of magnetic particles that have separated from the carrier surface; and they are not highly responsive to surface treatments.

SUMMARY OF THE INVENTION

An object, therefore, of the present invention is to provide a novel carrier for use in magnetic brush development of a latent electrostatic image in electrophotography or electrostatic recording.

Another object of the present invention is to provide a carrier for use in magnetic brush development that is free from the problem of loss of charge in the course of running operation, because of its high resistance to surface soiling.

Yet another object of the present invention is to provide a carrier for use in magnetic brush development that not only prevents premature fogging but also avoids the fouling of the interior of a copying or recording machine.

An additional object of the invention is a carrier that extends the life of the developer and permits rapid development.

It has now been found that these and other objects of the present invention can be attained by a developer carrier particle having a core containing a binder resin and a magnetic powder and a surface layer containing a compound having a lower critical surface tension than the binder resin.

DETAILED DESCRIPTION OF THE INVENTION

The term "critical surface tension" is described in detail in Fukugo Zairyo Kogaku (Composite Material Engineering), published by Nikkagiren Shuppan, pp. 148–153 (Sept. 1971), and it is determined by the following manner: contact angles ($\theta$) of various kinds of liquid having different surface tensions ($\gamma_L$) are measured on a test material using a contact angle measuring apparatus (CA-D type, produced by Kowa Kaimen Kagaku Co.); the surface tension ($\gamma_L$) and the contact angle ($\theta$) or the value of cos $\theta$ of each liquid are plotted to obtain a straight line, a so-called Zisman plot; and then the surface tension at $\theta=0$ or cos $\theta=1$ is obtained by extrapolation of the Zisman plot, which is defined as critical surface tension ($\gamma_c$).

A fluorine- or silicone-based compound is advantageously used as the compound having a low critical surface tension present in the surface layer of carrier particles according to the invention.

Suitable fluorine-based compounds include polymers having fluorine in the main chain, such as homopolymers of such monomers as tetrafluoroethylene, trifluoroethylene, vinylidene fluoride, monofluoroethylene and hexafluoropropylene, and copolymers of these monomers with other copolymerizable unsaturated monomers such as ethylene, propylene, butylehe, vinyl chloride, vinylidene chloride and trifluoroethylene.

Also advantageous are polymers of monomers having fluorine in side chains, for example, such as fluorinated alkyl acrylates and fluorinated alkyl methacrylates. Specific examples include esters of acrylic acid or methacrylic acid with alcohols, such as 1,1-dihydroperfluoroethyl, 1,1-dihydroperfluoropropyl, 1,1-dihydroperfluorohexyl, 1,1-dihydroperfluorooctyl, 1,1-dihydroperfluorodecyl, 1,1-dihydroperfluorolauryl, 1,1,2,2-tetrahydroperfluorobutyl, 1,1,2,2-tetrahydroperfluorohexyl, 1,1,2,2-tetrahydroperfluorooctyl, 1,1,2,2-tetrahydroperfluorodecyl, 1,1,2,2-tetrahydroperfluorolauryl, 1,1,2,2-tetrahydroperfluorostearyl, 2,2,3,3-tetrafluoropropyl, 2,2,3,3,4,4-hexafluorobutyl, 1,1,$\omega$-trihydroperfluorohexyl, 1,1,$\omega$-trihydroperfluorooctyl, 1,1,1,3,3,3-hexafluoro-2-chloropropyl, perfluorohexyl-ethyl, perfluorooctylethyl, 3-perfluorononyl-2-acetylpropyl, 3-perfluorolauryl-2-acetylpropyl, N-perfluorohexylsulfonyl-N-methylaminoethyl, N-perfluorohexylsulfonyl-N-butylaminoethyl, N-perfluorooctylsulfonyl-N-methylaminoethyl, N-perfluorooctylsulfonyl-N-ethylaminoethyl, N-perfluorooctylsulfonyl-N-butylaminoethyl, N-perfluorodecyl-sulfonyl-N-methylaminoethyl, N-perfluorodecylsulfonyl-N-ethylaminoethyl, N-perfluorodecylsulfonyl-N-butylaminoethyl, N-perfluorolaurylsulfonyl-N-methylaminoethyl, N-perfluorolaurylsulfonyl-N-ethylaminoethyl, and N-perfluorolaurylsulfonyl-N-butylaminoethyl, with perfluorohexylethyl methacrylate, perfluorooctylethyl methacrylate, 1,1,2,2-tetrahydroperfluorohexyl methacrylate and N-perfluorohexylsulfonyl-N-butylaminoethyl methacrylate being particularly preferred.

These fluorinated alkyl acrylates or methacrylates may be copolymerized with the following components:

(a) styrene monomers such as styrene, alkylstyrenes, (e.g., methylstyrene, dimethylstyrene, trimethylstyrene, ethylstyrene, diethylstyrene, triethylstyrene, propylstyrene, butylstyrene, hexylstyrene, heptylstyrene, and octylstyrene), halogenated styrenes (e.g., fluorostyrene, chlorostyrene, bromostyrene, dibromostyrene, and iodostyrene), as well as nitrostyrene, acetylstyrene, and methoxystyrene;

(b) addition polymerizable unsaturated carboxylic acids including unsaturated aliphatic monocarboxylic acids such as acrylic acid, methacrylic acid, α-ethylacrylic acid, crotonic acid, α-methylcrotonic acid, α-ethylcrotonic acid, isocrotonic acid, tiglic acid, and ungelicaic acid; and unsaturated aliphatic dicarboxylic acids such as maleic acid, fumaric acid, itaconic acid, citraconic acid, mesaconic acid, glutaconic acid, and dihydromuconic acid;

(c) esters of these addition polymerizable unsaturated carboxylic acids with alcohols such as alkyl alcohols (e.g., methyl alcohol, ethyl alcohol, propyl alcohol, butyl alcohol, amyl alcohol, hexyl alcohol, heptyl alcohol, octyl alcohol, nonyl alcohol, dodecyl alcohol, tetradecyl alcohol, hexadecyl alcohol), alkoxyalkyl alcohols in which alkyl alcohols are partially alkoxylated (e.g., methoxyethyl alcohol, ethoxyethyl alcohol, ethoxyethoxyethyl alcohol, methoxypropyl alcohol, and ethoxypropyl alcohol), aralkyl alcohols (e.g., benzyl alcohol, phenylethyl alcohol, and phenylpropyl alcohol), and alkenyl alcohols (e.g., allyl alcohol and crotonyl alcohol), the alkyl esters of acrylic acid, methacrylic acid, fumaric acid and maleic acid being particularly preferred;

(d) amides and nitriles derived from the above-described addition polymerizable unsaturated carboxylic acids;

(e) aliphatic monoolefins such as ethylene, propylene, butene, and isobutylene;

(f) halogenated aliphatic olefins such as vinyl chloride, vinyl bromide, vinyl iodide, 1,2-dichloroethylene, 1,2-dibromoethylene, 1,2-diiodoethylene, isopropenyl chloride, isopropenyl bromide, allyl chloride, allyl bromide, vinylidene chloride, vinyl fluoride, and vinylidene fluorode;

(g) conjugated diene-based aliphatic diolefins such as 1,3-butadiene, 1,3-pentadiene, 2,3-dimethyl-1,3butadiene, 2,4-hexadiene, and 3-methyl-2,4-hexadiene; and (h) nitrogen-containing vinyl monomers such as 2-vinylpyridine, 4-vinylpyridine, 2-vinyl-6-methylpyridine, 2-vinyl-5-methylpyridine, 4-butenylpyridine, 4-pentyl-pyridine, N-vinylpiperidine, 4-vinylpiperidine, N-vinyldihydropyridine, N-vinylpyrrole, 2-vinylpyrrole, N-vinylpyrroline, N-vinylpyrrolidine, 2-vinylpyrrolidine, N-vinyl-2-pyrrolidone, N-vinyl-2-piperidone, and N-vinylcarbazole. These comonomers may be used either alone or in combination.

When the fluorine-based compound is a copolymer, the content of the comonomer component described above is preferably less than 50 mol%.

Further, fluorinated epoxy resins, fluorinated polyester resins, and fluorinated silicone resins can be used as well as fluorine-containing nonpolymeric compounds, including fluorine-based coupling agents such as fluorine-containing alkoxysilanes, fluorine-containing titanium acylates, fluorine-containing alkoxy titanium, and fluorine-containing alkoxy zirconium; fluorine-based surfactants; and other fluorine-containing non-polymeric compounds.

Typical examples of the silicone-based compound that can be used as the compound having a low critical surface tension include polymethylphenyl siloxane and polydimethyl siloxane. Also useful is a "modified" silicone varnish that has been modified with alkyd resins, phenolic resins or epoxy resins.

Of these compounds, the fluorine-based compounds are preferably used, and polymers or copolymers containing as a monomer component a fluorine-based acfylate or methacrylate and having a critical surface tension of from 18 to 22 dyn/cm are particularly preferred.

In addition to the above-described compound, the surface layer of the carrier particle may contain less than 90 wt% of a resin selected without limitation from any thermoplastic resins in common use. Specific examples are homo- and copolymers of monomers that include styrenes such as styrene, chlorostyrene and vinylstyrene; monoolefins such as ethylene, propylene, butylene and isobutylene; vinyl esters such as vinyl acetate, vinyl propionate, vinyl benzoate and vinyl butyrate; esters of μ-methylene aliphatic monocarboxylic acids such as methyl acrylate, ethyl acrylate, butyl acrylate, dodecyl acrylate, octyl acrylate, phenyl acrylate methyl methacrylate, ethyl methacrylate, butyl methacrylate and dodedyl methacrylate; vinyl ethers such as vinyl methyl ether, vinyl ethyl ether and vinyl butyl ether; and vinyl ketones such as vinyl methyl ketone, vinyl hexyl ketone and vinyl isopropenyl ketone. Typical resins that can be used in the surface layer include polystyrene, styrene/alkyl acrylate copolymers, styrene/alkyl methacrylate copolymers, styrene/acrylonitrile copolymers, styrene/butadiene copolymers and styrene/maleic anhydride copolymers.

Other suitable resins include polyesters, polyurethanes, epoxy resins, silicone resins, polyamides, modified rosin, paraffins and waxes. Polymers of halogen-containing monomers such as olefin chlorides can also be used.

Of these resins, styrene polymers, acrylic polymers, and copolymers of a styrene monomer and an acrylic monomer are preferably used. When these polymers or copolymers are used in an amount of 50 wt% or more, preferably 70 wt% or more, based on the total weight of the surface layer, they do not react during formation of the surface layer, so that heat characteristics of the surface layer are not deteriorated, and the resulting carrier has high charge stability in humid condition.

The core portion of the developer carrier particle contains a fine magnetic powder and a binder resion.

Any of the fine magnetic particles that are conventionally used as fine particulate ferromagnetic materials can be dispersed in the binder resin in the core portion of the carrier particle of the present invention, including such illustrative examples as fine particles of magnetite, gamma-hematite, ferrites, chrominum oxide and other metals. The magnetic particles are generally used in an amount of from about 30 to 95 wt%, preferably from about 45 to 90 wt%, of the total weight of the carrier particle.

The binder resin used as the matrix of the core portion of the carrier particles of the present invention may be selected from among homo- and copolymers of monomers such as styrenes (e.g., styrene, chlorostyrene and vinylstyrene), monoolefins (e.g., ethylene, propylene, butylene and isobutylene), vinyl esters (e.g., vinyl acetate, vinyl propionate, vinyl benzoate, and vinyl butyrate), esters of α-methylenealiphatic monocarboxylic acids (e.g., methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate), vinyl ethers (e.g. vinyl methyl ether, vinyl ethyl ether and vinyl butyl ether), and vinyl ketones (e.g. vinyl methyl ketone, vinyl hexyl ketone and vinyl isopropenyl ketone). Typical binder resins include polystyrene, styrene/alkyl acrylate copolymers, styrene/alkyl methacrylate copolymers, styrene/acrylonitrile copolymers, styrene/-butadiene copolymers and styrene/maleic anhydride copolymers, polyethylene and polypropylene.

Other usable binder resins include polyesters, polyurethanes, epoxy resins, silicone resins, polyamides, modified rosin, paraffins and waxes.

In addition to the aforementioned binder resin and fine magnetic particles, the core portion of the carrier of the present invention may contain other additives, such as fine powders of a resin, an antistat, a coupling agent and a filler, for various purposes such as charge control, improving dispersion stability, reinforcement of strength, and providing improved fluidity.

The core of the carrier of the present invention may be produced by a variety of methods; for example, a binder resin and fine magnetic particles can be mixed in a thermal melting/mixing device such as a kneader or a Banbury mixer, and the resulting mix can be ground into particles and separated into particles of a predetermined size; alternatively, the mix can sprayed, cooled and solidified. In another method, a binder solution in which the fine magnetic particles are dispersed is spray-dried.

The surface layer is suitably formed on the core surface by coating the core of each of the carrier particles with a solution containing the appropriate compound having a low critical surface tension or a mixture thereof with a resin for the surface layer (hereafter referred to as "surface component"), dissolved in a solvent that does not dissolve the core resin, and the solvent is thereafter removed.

Illustrative coating apparatus that can be used include a fluidized bed, a spray dryer and a kneader coater.

A fluidized bed coating method is preferably employed so as to provide a uniform and continuous overcoat on the core. In this method, the core particles are suspended or circulated in heated air flowing upwardly and spray-coated with a solution of the surface component, and the coated core particles are then sedimented in air stream with a less air flow speed wherein the solvent is evaporated to form a surface layer on the core. The temperature of the fluidized bed varies depending on the kind of solvents, and it is generally from 20° to 30° C. lower than the boiling point of the solvent used.

The surface component is preferably applied in an amount of from 0.005 to 3.0 wt%, more preferably from 0.05 to 2.5 wt%, of the core. The surface layer preferably has a thickness of from about 0.01 to- 5.0 μm, preferably from about 0.1 to 1.0 μm, so as to protect the core and to aid the triboelectrification of toner particles.

The carrier particles of the present invention can also be produced without applying the coating of the surface component on to the core. That is, the carrier particles can be produced by a process including melting a carrier composition containing the binder resin, the magnetic powder, and the compound having a lower critical surface tension than the binder resin, spraying the molten composition to form fine droplets, and cooling the droplets in a gas stream to form fine substantially spherical developer carrier particles. According to this process, only the compound having a low critical surface tension comes out to the surface of the droplets during the cooling step to spontaneously form a surface layer. Since the core portion and the surface layer are formed simultaneously, this process is preferred for the preparation of the carrier particles of the present invention.

In order to prepare the carrier by the specific process of the present invention, a composition that contains the essential components (i.e., the binder resin, the low-critical surface tension compound and the fine magnetic particles described above) and any other desired components is melted by heating it in a suitable mixer such as a kneader, a roll mill, a Banbury mixer or a sand mill, and the resulting mix, while molten, is sprayed or atomized with air into fine droplets, followed by cooling for solidification in a gas stream having a comparatively low temperature.

More specifically, the production equipment consists basically of the following components: a pretreatment unit including a thermally melting/mixing apparatus and a vessel in which the viscosity of the mix is adjusted; a pump for conveying the mix to a spray unit; and a cooling tower for cooling the sprayed mix to solidify the carrier particles.

A kneader, a roll mill, a Banbury mixer, a sand mill, an attritor, a Henschel mixer, etc. can be used as the thermal melting/mixing apparatus. An advantageous sprayer is a nozzle or disk sprayer, but the invention is not limited thereto.

The carrier composition to be melted may container thermoplastic resins which can be used in the surface layer as described above, such as homo- and copolymers of monomers selected from styrenes, monoolefins, vinyl esters, α-methylene aliphatic monocarboxylic acid esters, vinyl ethers, and vinyl ketones. Preferred among the resins are a polyester and a polyolefin having a weight average molecular weight ($\overline{M}w$) of from about 500 to 20,000, with those having a weight average molecular weight of from about 500 to 7,000 being particularly preferred since they make it easy to produce almost completely spherical carriers.

Significant factors that govern the shape of carrier particles and their surface state include the viscosity of the molten mix to be sprayed, the size of magnetic particles, and the cooling temperature. In order to produce a carrier comprised of spherical and smooth-surfaced particles, the viscosity of the molten mix is preferably adjusted to about 10,000 cPs or below, more preferably to about 7,000 cPs or below, at temperatures between 100° and 200° C. The size of the magnetic particles used in the present invention is generally not more than about 5 μm, preferably not more than about 2 μm. The cooling temperature generally ranges from room temperature to about 100° C., preferably from about 50° to 100° C. Near room temperature, some difficulty is encountered in producing satisfactorily spherical particles.

In order to attain a balance between the life of the developer, nonadhesion of carrier particles to the surface of the photoreceptor, and the image quality attainable, the carrier particles to be produced in accordance with the present invention have an average size of from about 10 to 400 vm, preferably from about 25 to 300 vm, and more preferably from about 50 to 150 μm. Particle sizes in these ranges can be readily attained by adjusting such operating parameters as the diameter of nozzle or the rotating speed of the disk employed in the sprayer.

The thus prepared carrier of the present invention may be immediately mixed with a toner and used as a developer for rendering a latent electrostatic image visible by the magnetic brush method. If desired, the carrier particles having a high degree of surface smoothness and substantially spherical in shape may be surface-treated or coated with an appropriate material such as a resin, a coupling agent, a surfactant, a charge control agent or a fine powder.

The toner may be any type of chargeable toner that is conventionally employed in electrophotography having a colorant dispersed in a binder resin.

The carrier particles according to the present invention which can effectively be used in the development of a latent electrostatic image by the magnetic brush method, have various advantages.

The tendency of the fine magnetic particles to separate from the carrier surface is so small that the carrier is far stabler with respect to environmental factors; particular, it exhibits much smaller fluctuation in the quantity of charge generated in summer and winter than conventional magnetic particle-dispersed carriers.

An additional advantage of the carrier particles of the present invention is that its chargeability can be controlled by adjusting the type and amount of the low-critical surface tension compound used, while the carrier particles can effectively charge the toner positively. In addition, the surface layer has a sufficiently low surface energy so that the carrier particles are free from toner contamination, thus extending the life of the developer and ensuring consistent charging.

The following examples and comparative examples are provided for the purpose of further illustrating specific embodiments of the present invention, but are not to be construed as limiting its scope. In the example and comparative examples, all parts, percents and ratios are by weight unless otherwise indicated.

EXAMPLE 1

Eighty parts of fine magnetic particles (EPT-1000 of Toda Kogyo Co.; average particle diameter 0.35 μm) and 20 parts of polyethylene wax (Mitsui Hi-wax 400P of Mitsui Petrochemical Industries, Ltd.) were heated at 120° C., melted and kneaded for 20 minutes in a pressure kneader. When an intimate mixture was obtained, it was cooled to 25° C. to solidify with a disk-type sprayer and subsequently classified to obtain spherical carrier cores with an average size of 100 αm in which fine magnetic particles were dispersed.

Half a part of a styrene (St)/methyl methacrylate (MMA) copolymer (St/MMA =95/5 by weight ratio; $\overline{M}w$ 15,000) and 0.05 parts of a condensation product of perfluorononanoic acid and tetrabutoxy zirconium were dissolved in acetone at a concentration of 10%. A hundred parts of the carrier cores were coated with the resulting acetone solution using a fluidized-bed coater so as to produce coated carrier particles in a spherical form according to the present invention.

COMPARATIVE EXAMPLE 1

Uncoated spherical carrier particles with an average size of 100 μm having magnetic particles dispersed therein were produced as in Example 1 except that the carrier cores did not receive any coating treatment.

EXAMPLE 2

Seventy parts of fine magnetic particles (EPT-1000) and 30 parts of polystyrene ($\overline{M}w$ 65,000) were melted and mixed in a pressure kneader. The mix was ground in a turbo mill and classified in a classifying machine to obtain anomalous carrier cores with an average size of 100 μm which had fine magnetic particles dispersed therein. 0.2 parts of perfluorohexylethyl methacrylate ($\gamma_c$ about 18 dyn/cm) was dissolved in a fluorine-based solvent (Difulon Solvent S-3 of Daikin Kogyo Co., Ltd.) at a concentration of 10%. A hundred parts of the carrier cores were coated with the resulting solution using a fluidized-bed coater so as to produce coated carrier particles in an anomalous form according to the present invention.

COMPARATIVE EXAMPLE 2

Uncoated carrier particles in an anomalous form with an average size of 100 μm that had magnetic particles dispersed therein were produced as in Example 2 except that the particles did not receive any coating treatment.

The carriers prepared in Examples 1, and 2 and in Comparative Examples 1 and 2 were formulated as developers (toner content 3 wt%) and their performance was evaluated.

The toner used in making the developers was a product of Fuji Xerox Co., Ltd. designed for use with a copying machine Model FX-7770 equipped with a negatively charging photoreceptor, which was prepared in the following manner. That is, a four-necked flask was charged with 120 g of polypropylene (number average molecular weight ($\overline{M}n$) 5,000; melting point 150° C.), 600 g of a polyester resin containing an unsaturated bond in the main chain prepared from bishpenol A, propylene glycol, and fumaric acid (glass transition point 40° C.; $\overline{M}n$ 2,000), 800 ml of xylene, and 11 g of tert-butyl peroxide. The mixture was raised in temperature to the reflux temperature of xylene. While maintaining the mixture at that temperature, 480 g of a mixture of 65 parts of styrene and 35 parts of n-butyl methacrylate was dropped over 4 hours through a dropping funnel. After the dropwise addition was completed, the mixture was further stirred for 1 hour at the reflux temperature of xylene. After the polymerization was completed, the reaction mixture was cooled to room temperature, freed of the solvent, and then vacuum dried to yield a graft copolymer. Then, 90 parts of the graft copolymer and 10 parts of carbon black were mixed, melt kneaded, and the finely pulverized to produce toner having an average particle size of 11 μm.

The four developer samples were subjected to a copying test using an evaluation bench machine with the speeds of the photoreceptor and the developing magnetic roll (sleeve) set at 350 mm/sec and 550 mm/sec, respectively, to evaluate both initial performance (i.e., the quantity of charges generated, the density of solid images, the fog density at the background, and the reproduction of fine lines) and performance after $10^5$ runs (i.e., the quantity of charges generated, the density of solid images, the fog density in the background, and the reproduction of fine lines). The same copying test was conducted both under hot and humid conditions (30° C. and 80%RH) and under cool and dry conditions (10° C. and 30%RH).

The quantity of charges of toner particles (μc/g) was measured by means of a Faraday Cage (a blow off method). The device comprises a stainless steel cylinder having a diameter cf about 1 inch and a length of about 1 inch. A screen is positioned at each end of the cylinder, and the screen openings are of such a size as to permit the toner particles to pass through the openings but prevent the carrier particles from making such passage. The Faraday Cage is weighed, charged with about 0.5 g of the carrier particles and toner particles, reweighed, and connected to the input of a coulomb meter. Dry compressed air is then blown through the cylinder to drive all the toner particles from the carrier particles. As the electrostatically charged toner particles leave the Faraday Cage, the oppositely charged carrier particles cause an equal amount of electronic charge to flow from the Cage, through the coulomb meter, to ground. The coulomb meter measured this charge which is then taken to be the charge on the toner particles which was removed. Next, the cylinder is reweighed to determined the weight of the toner particles removed. The resulting data are used to calculate the average charge to mass ratio of the toner particles.

The density of solid images and the fog density at the background were measured using a densitomerter, Macbeth RD-517 produced by Macbeth Co., with reference to a gray scale produced by Eastman Kodak Co.

Further, the reproduction of fine line at the initial stage and after $10^5$ runs was examined and evaluated as follows: A (capable of reproducing fine lines of 175 lines/inch), B (capable of reproducing fine lines of 133 lines/inch but not of 175 lines/inch), and C (incapable of reproducing fine lines of 133 lines/inch).

The test results are shown in the following Table 1, from which the superiority of the carrier prepared in accordance with the present invention is seen.

TABLE 1

| | Initial performance | | | | Environmental test | | After $10^5$ runs | | | | | |
|---|---|---|---|---|---|---|---|---|---|---|---|---|
| Sample No. | Quantity of charges generated (μc/g) | Density of solid image | Fog density in background | Reproduction of fine lines | Under summer conditions (30° C., 80% RH) | Under winter conditions (10° C., 30% RH) | Quantity of charges generated (μc/g) | Density of solid image | Fog density in background | Reproduction of fine lines | Life (runs) | Overall rating |
| Example 1 | 14 | 1.42 | 0.00 | A | good | good | 12 | 1.50 | 0.03 | A | $>10^5$ | good |
| Comp. Example 1 | 12 | 1.50 | 0.00 | A | increased fog in background due to reduced quantity of charges | good | 6 | 1.33 | 0.09 | B | ca. $5 \times 10^4$ | poor |
| Example 2 | 15 | 1.38 | 0.00 | A | good | good | 13 | 1.48 | 0.02 | A | $>10^5$ | good |
| Comp. Example 2 | 14 | 1.40 | 0.00 | A | increased fog in background due to reduced quantity of charges | reduced density of image due to increased quantity of charges | 7 | 1.40 | 0.08 | B | ca. $5 \times 10^4$ | poor |

EXAMPLE 3

| | Parts |
|---|---|
| Polyethylene wax (400P) | 30 |
| Perfluorohexylethyl acrylate/styrene copolymer (ratio 50/50; $\overline{M}w$ 1 × $10^4$; γc 18 dyn/cm) | 2 |
| Magnetic powder (EPT-1000) | 60 |
| Carbon black | 3 |
| Barium titanate | 5 |

The above-noted components were mixed, heated at 120° C., melted, and kneaded for 20 minutes in a pressure kneader, and then the temperature was increased to 150° C. The mix, while maintained in a molten state at 150° C., was spray-dried and cooled at 25° C. to produce carrier particles with an average size of 45 μm according to the present invention.

EXAMPLE 4

| Components | Parts |
|---|---|
| Polyethylene wax (400P) | 30 |
| Condensation product of perfluorononanoic and tetrabutoxy zirconium | 2 |
| Magnetic powder (Cu/Zn ferrite chips) | 68 |

The above-noted components were processed as in Example 3 to prepare carrier particles having an average size of 55 μm.

COMPARATIVE EXAMPLE 3

Carrier particles with an average size of 45 μm were prepared as in Example 3 except that the perfluorohexylethyl acrylate/styrene copolymer was omitted.

COMPARATIVE EXAMPLE 4

Carrier particles with an average size of 50 μm were prepared as in Example 3 except that the mix was not sprayed, but was cooled, ground into particles and subjected to size classification.

The carriers prepared in Examples 3 and 4 and in Comparative Examples 3 and 4 were formulated as developers (toner content 3 wt%) and their performance was evaluated as in the same manner as described above.

Further, the adhesion of toner particles to carrier surface was also measured in terms of the amount (mg) of toner particles adhered to 1 g of the carrier and not removed by washing with an aqueous solution of surface active agent after $10^5$ runs.

The test results are shown in the following Table 2, from which the superiority of the carrier prepared in accordance with the present invention is seen.

TABLE 2

| Sample No. | Initial performance: Quantity of charges generated (μc/g) | Density of solid image | Fog density in background | Environmental test: Under summer conditions (30° C., 80% RH) | Under winter conditions (10° C., 30% RH) | After $10^5$ runs: Quantity of charges generated (μc/g) | Density of solid image | Fog density in background | Adhesion of toner to carrier surface mg/g of carrier) | Life (runs) | Overall rating |
|---|---|---|---|---|---|---|---|---|---|---|---|
| Example 3 | 18 | 1.35 | 0.00 | good | good | 16 | 1.51 | 0.02 | 17 | $>10^5$ | good |
| Example 4 | 19 | 1.39 | 0.00 | good | good | 14 | 1.43 | 0.01 | 29 | $>10^5$ | good |
| Comp. Example 3 | 9 | 1.51 | 0.04 | increased fog in background due to reduced quantity of charges | good | 4 | 0.80 | 0.15 | 51 | $2 \times 10^4$ | poor |
| Comp. Example 4 | 12 | 1.50 | 0.03 | increased fog in background due to reduced quantity of charges | reduced density of image due to increased quantity of charges | 7 | 1.15 | 0.09 | 70 | $4 \times 10^4$ | poor |

While the invention has been described in detail and with reference to specific embodiments thereof, it will be apparent to one skilled in the art that various changes and modifications can be made therein without departing from the spirit and scope thereof.

What is claimed is:

1. A developer carrier comprising a core having magnetic particles having an average particle size of not more than about 2 μ dispersed in a binder resin, and having on said core a surface layer containing a fluorine-based compound having a lower critical surface tension than said binder resin, said binder resin being a thermoplastic resin selected from the group consisting of homopolymers and copolymers comprising at least one monomer selected from a styrene, a monoolefin, a vinyl ester, an ester of an μ-methylene aliphatic monocarboxylic acid, a vinyl ether, and a vinyl ketone and said fluorine-based compound being fluorinated alkyl acrylate or methacrylate copolymerized with a monomer selected from the group consisting of a styrene monomer, an addition polymerizable unsaturated carboxylic acid, an ester of an addition polymerizable unsaturated carboxylic acid with an alcohol selected from an alkyl alcohol, an alkoxyalkyl alcohol, an aralkyl alcohol, and an alkenyl alcohol, an amide or nitrile derivative of an addition polymerizable unsaturated carboxylic acid, an aliphatic monoolefin, a halogenated aliphalic olefin, a conjugated diene-based aliphatic diolefin, and a nitrogen-containing vinyl monomer.

2. The developer carrier as claimed in claimed in claim 1, said carrier is one negatively charged.

3. The developer carrier as claimed in claim 1, wherein said surface layer further contains 50% or more, based on the total weight of the surface layer, of a polymer or copolymer of at least one monomer selected from the group consisting of a styrene monomer, an acrylic monomer and a methacrylic monomer.

4. The developer carrier as claimed in claim 1, wherein said fluorine-based compound is a fluorinated alkyl acrylate or methacrylate copolymerized with an alkyl ester of an unsaturated carboxylic acid selected from acrylic acid, methacrylic acid, fumaric acid and maleic acid.

5. The developer carrier as claimed in claim 1, wherein said surface layer has a thickness of from about 0.01 to 5 μm.

6. The developer carrier as claimed in claim 7, wherein said surface layer has a thickness of from about 0.1 to 1.0 μm.

7. The developer carrier as claimed in claim 1, wherein said fluorine-based compound is present in said surface layer in an amount of about 10 wt% or more based on the total amount of said surrace layer.

8. The developer carrier as claimed in claim 1, wherein said magnetic particles are present in said core in an amount of from about 30 to 95 wt% of the total amount of the carrier particle.

9. The developer carrier as claimed in claim 8, wherein said magnetic particles are present in said core in an amount of from about 45 to 90 wt% of the total amount of the carrier particle.

10. The developer carrier as claimed in claim 1, wherein said surface layer further comprises a resin in an amount of from about 50 to 90 wt% of the total amount of said surface layer.

11. The developer carrier as claimed in claim 1, wherein said developer carrier has an average particle size of from about 10 to 400 μm.

12. The developer carrier as claimed in claim 11, wherein said developer carrier has an average particle size of from about 25 to 300 μm.

13. The developer carrier as claimed in claim 1, wherein said fluorine-based compound is a polymer or copolymer containing as a monomer component a fluorine-based acrylate or methacrylate and having a critical surface tension of from 18 to 2 dyn/cm.

14. A developer carrier comprising a core having magnetic particles having an average particle size of not more than about 2 $\mu$ dispersed in a binder resin, and having on said core a surface layer containing a fluorine-based compound having a lower critical surface tension than said binder resin, said binder resin being a thermoplastic resin selected from the group consisting of homopolymers and copolymers comprising at least one monomer selected from a styrene, a monoolefin, a vinyl ester, an ester of an $\alpha$-methylene aliphatic monocarboxylic acid, a vinyl ether, and a vinyl ketone and said fluorine-based compound being a fluorinated alkyl accrylate or methacrylate copolymerized with a monomer selected from the group consisting of a styrene monomer, an addition polymerizable unsaturated carboxylic acid, an ester of an addition polymerizable unsaturated carboxylic acid with an alcohol selected from an alkyl alcohol, an alkoxyalkyl alcohol, an aralkyl alcohol, and an alkenyl alcohol, an amide or nitrile derivative of an addition polymerizable unsaturated carboxylic acid, an aliphatic monoolefin, a halogenated aliphalic olefin, a conjugated diene-based aliphatic diolefin, and a nitrogen-containing vinyl monomer, wherein said developer carrier is produced by a process comprising the steps of (a) melting a composition comprising said binder resin, said magnetic powder and said fluorine-based compound having a lower critical surface tension than said binder resin to form a molten carrier composition, (b) spraying said molten carrier composition to form droplets, and (c) cooling said droplets in a gas stream having a temperature lower than the melting point of said molten composition to form substantially spherical particles.

15. The developer carrier as claimed in claim 14, wherein said molten carrier composition has a viscosity of about 10,000 cPs or below at a temperature of from 100° to 200° C. and said gas stream in said cooling step has a temperature of from about room temperature to about 100° C.

16. The developer carrier as claimed in claim 14, wherein said molten carrier composition has a viscosity of about 7,000 cPs or below at a temperature of from 100° to 200° C. and said gas stream in said cooling step has a temperature of from about 50° to about 100° C.

17. The developer carrier as claimed in claim 14, wherein said molten carrier composition is at a viscosity of 10,000 cPs at a temperature between 100° and 200° C. and said cooling temperature is from room temperature to about 100° C.

* * * * *